358-84. XR 2,855,993 SR

TX 5027
Rn

Oct. 14, 1958 H. A. RAHMEL 2,855,993

SYSTEM AND APPARATUS FOR DETERMINING THE LISTENING OR VIEWING HABITS OF WAVE SIGNAL RECEIVER USERS

Filed March 19, 1954 4 Sheets-Sheet 1

INVENTOR.
Henry A. Rahmel
By:
Mason, Kolehmainen, Rathburn & Wyss
Attys.

Oct. 14, 1958 H. A. RAHMEL 2,855,993

SYSTEM AND APPARATUS FOR DETERMINING THE LISTENING OR VIEWING HABITS OF WAVE SIGNAL RECEIVER USERS

Filed March 19, 1954 4 Sheets-Sheet 2

INVENTOR.
Henry A. Rahmel
By: Mason, Kolehmainen, Rathburn & Wyss
Attys.

SYSTEM AND APPARATUS FOR DETERMINING THE LISTENING OR VIEWING HABITS OF WAVE SIGNAL RECEIVER USERS

Filed March 19, 1954

INVENTOR.
Henry A. Rahmel
By:
Mason, Kolehmainen, Rathburn & Wyss
Attys

Oct. 14, 1958 H. A. RAHMEL 2,855,993

SYSTEM AND APPARATUS FOR DETERMINING THE LISTENING OR VIEWING HABITS OF WAVE SIGNAL RECEIVER USERS

Filed March 19, 1954 4 Sheets-Sheet 4

INVENTOR.
Henry A. Rahmel
BY
Mason, Kolehmainen, Rathbun, Wyss
Attys.

United States Patent Office 2,855,993

Patented Oct. 14, 1958

2,855,993

SYSTEM AND APPARATUS FOR DETERMINING THE LISTENING OR VIEWING HABITS OF WAVE SIGNAL RECEIVER USERS

Henry A. Rahmel, Evanston, Ill., assignor to A. C. Nielsen Company, Chicago, Ill., a corporation of Illinois Application March 19, 1954, Serial No. 417,478

5 Claims. (Cl. 161—3)

The present invention relates to systems and apparatus for determining the listening and/or viewing habits of users of wave signal receivers whether the wave signal receiver is a standard broadcast receiver, a frequency modulation receiver, or a television receiver. More specifically, the present invention relates to improvements in systems and apparatus for determining the audience popularity rating of different programs transmitted from one or more wave signal transmitters together with an improved system for gathering information of importance in determining the effectiveness of radio and television advertising.

It has long been recognized that instrumented methods of determining the listening and/or viewing habits of wave signal receiver users are the only accurate ways of getting the basic listening or viewing information from which the effectiveness of radio or television advertising can be determined. Such instrumented methods extensively employed by the assignee of the instant application have involved producing a continuous record of the tuning condition of the wave signal receiver day in and day out for twenty-four hours a day so that every turn of the dial, every retune, every set turn-on and turn-off is recorded. Obviously, to provide such fully instrumented service is expensive, since the equipment itself is relatively complicated and it would be desirable to provide a system and apparatus which would be substantially less expensive and which still would have many of the advantages of the instrumented methods referred to.

There are, of course, numerous other non-instrumented methods of determining the effectiveness of radio and television advertising which involved making numerous telephone calls to determine what program the particular listener or viewer happens to be listening to or watching at the time the call is made. Such systems obviously have very great shortcomings. There is not the slightest assurance that the wave signal receiver is being used in the manner indicated by the recipient of the call, since the recipient of the call may state any station merely to get rid of the caller. The postcard system of obtaining such information has the same shortcomings.

It would be desirable to provide an arrangement which would give accurate data with regard to the listening or viewing audience and in which a lower capital investment for equipment would be involved. A collaborator maintained record or diary of some sort, when supplemented with means to be described, could be a very satisfactory arrangement for obtaining viewing and listening information with respect to wave signal receiver users, because it makes possible the obtaining of additional information regarding the composition of the audience, such as the number of listeners or viewers, age group, sex and the like. Such information is not available where only a continuous record of the tuning condition of the receiver is obtained. If information with respect to the audience composition is desired with devices which record the tuning condition of the receiver at all times, it would be necessary to supply some mechanism by which the collaborator could indicate this on the record at periodic intervals. This could be accomplished, for example, by having the collaborator push certain buttons provided on the recording instrument which would give information as to the audience composition.

Any diary type scheme that requires collaboration or cooperation by the collaborator requires that the collaborator be reminded to make the necessary entry or actuate the necessary push-buttons. Thus it is necessary to provide a system and apparatus that will insure some sort of quality control. It would be desirable to provide means for determining whether or not the collaborator, even though reminded to take certain action, actually can be checked with respect to the accuracy of the action which he has taken. It would be desirable, therefore, to provide a prompted diary system for recording information with respect to the tuning condition of wave signal receivers which prompted diary system should greatly reduce the magnitude of diary omissions and provide a determination of the quantitative variations of the diary biases by means which readily show such biases. In other words, the diary system of obtaining this information is completely inadequate and has been so recognized for years, but a prompted diary system with quality control means associated therewith which might be supplemented by well known instrumented methods already in use can provide very valuable information at a greatly reduced cost.

Heretofore, listening to automobile radios or receivers has not been monitored by instrumented methods and it would be desirable to provide a system which would not neglect this segment of the wave signal receiver audience.

Accordingly, it is an object of the present invention to provide an improved system of obtaining information with respect to the listening and viewing habits of wave signal receiver users.

It is another object of the present invention to provide a prompted diary system with associated quality control means for obtaining information with regard to the listening and viewing habits of wave signal receiver users.

Still another object of the present invention resides in a prompted diary system of obtaining information of the listening and/or viewing habits of wave signal receiver users which is of assured accuracy, and the data of which may be merged or combined with the data obtained from a wholly instrumented system to assure complete accuracy.

It is another object of the present invention to provide an apparatus to be used in conjunction with a special type of diary so that with collaborator assistance, greatly improved data with regard to the listening and viewing habits of wave signal receiver users may be obtained.

It is a further object to provide an improved system for obtaining information with respect to the listening habits of wave signal receiver users at a cost which is substantially lower than that now possible for obtaining comparable information, and which will also take into account all receivers including wave signal receivers used in automobiles.

It is another object to provide a system in which accurate information may be obtained with regard to the listening habits of wave signal receiver users together with information with respect to the audience composition.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which.

In its simplest form the present invention involves the use of a specially designed diary to be used with each wave signal receiver being monitored together with a device which records or indicates the total amount of time that a particular receiver is turned on for signal reception together with reminder means for periodically reminding the collaborator who is using the wave signal receiver that a predetermined amount of listening time such as a half hour of listening time has elapsed and that a record should be made in the diary of the stations to which the receiver has been tuned during the elapsed half hour and other pertinent information with respect thereto. The record or indication of total time that the receiver has been turned on is, of course, a quality control check on the entries made in the diary. For more elaborate quality control checks a record may also be kept of the number of times that the receiver has been turned on, and in a still more elaborate arrangement a further record may be kept of the number of times that the receiver has been retuned together with reminder means actuated by such retuning to provide additional means for checking the quality of the entries made by the collaborator.

Figures 1, 2:
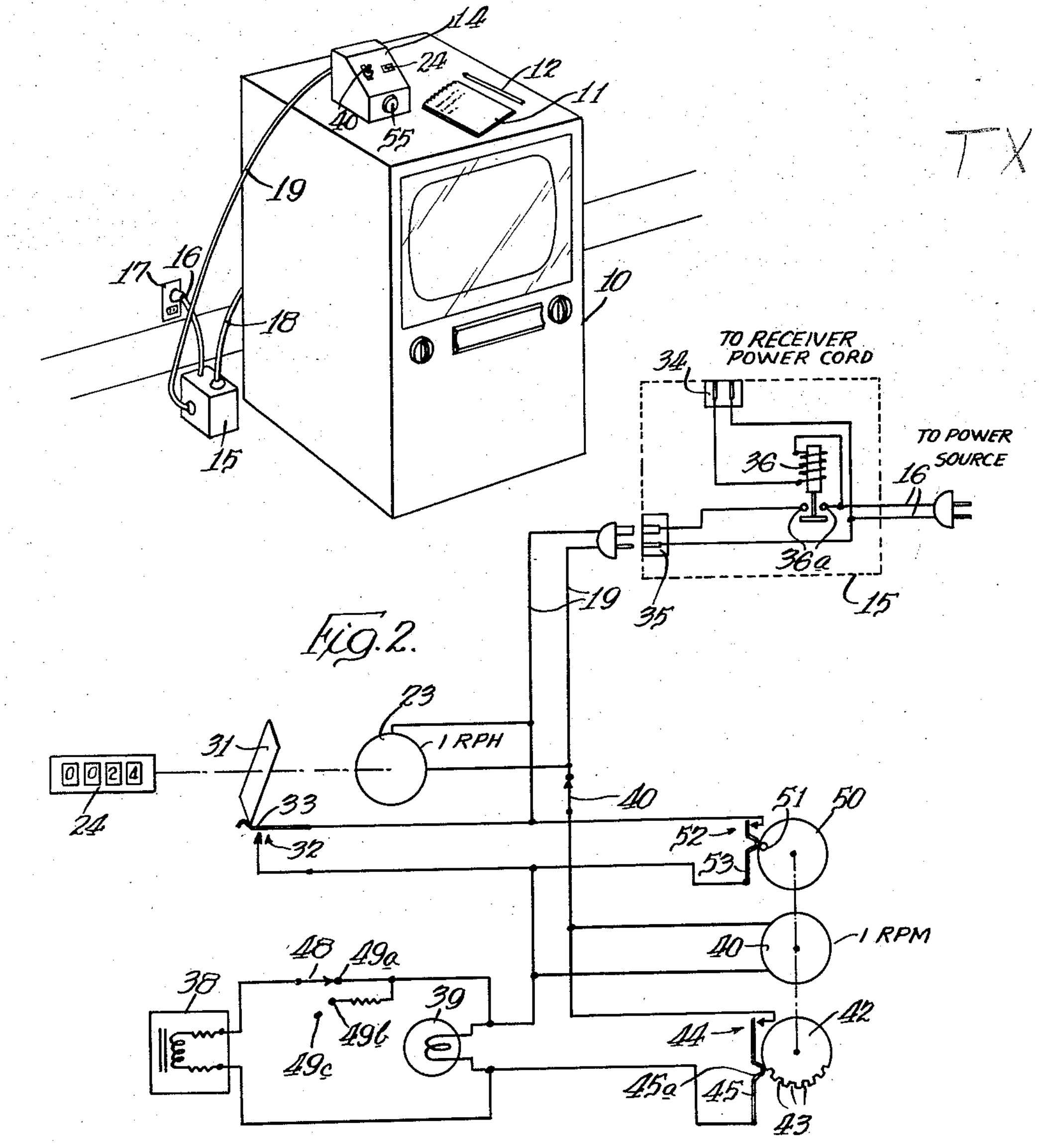
Fig. 1 is a perspective view of a wave signal receiver and the apparatus of the present invention associated therewith to insure a greatly improved and yet inexpensive means of obtaining accurate information of the listening and/or viewing habits of wave signal receiver users.
Fig. 2 is a schematic diagram including a circuit diagram of the arrangement of Fig. 1 to be associated with the wave signal receiver of Fig. 1.

Referring now to Fig. 1 of the drawings, there is illustrated a wave signal receiver 10 which has been illustrated as a television receiver but which obviously could be a radio receiver of either the amplitude modulation or the frequency modulation type. Although it has been shown as a television receiver disposed in a home or similar location, it will become apparent as the following description proceeds that it might also be an automobile receiver. Heretofore no means has been provided for obtaining information with respect to wave signal receivers used in automobiles. It is recognized that a substantial amount of listening takes place in automobiles and it is desirable to make a record of such listening so that the radio advertiser may have accurate knowledge of the effectiveness of his radio advertising without excluding important segments of the listening or viewing audience. It should be understood that the wave signal receiver 10 is therefore merely representative of any general wave signal receiver and is by way of example only.

For the purpose of obtaining in an inexpensive manner a record of the tuning condition of the wave signal receiver 10, there is associated therewith a suitable diary designated as 11 and a suitable pencil 12 or other means for making entries in the diary 11. The diary 11 will be furnished the collaborator by the research or analysis organization determining the listening and/or viewing habits of wave signal receiver users and will preferably be designed to make the entries on the part of the collaborator very simple and yet furnish the maximum amount of information to the analysis organization. It will be appreciated that the particular arrangement of the diary 11 and the particular design of the receiver 10 are unimportant as far as the present invention is concerned except that the diary should be one that keeps the collaborator's work at a minimum and yet provides a maximum of information to the analysis organization.

It will be appreciated that the diary arrangement 11 which has been indicated as some sort of a pad or tablet or notebook could also be of many other forms. It could, for example, comprise a moving tape or other record medium which moves in a predetermined manner with respect to time upon which information may be impressed by the collaborator by actuating certain buttons. It might be a tape which moves each time a record is made or each time a reminder signal is actuated. Whatever form the diary 11 takes, and the term diary is used in a broad manner to indicate any medium in connection with which the collaborator must perform some act to make sure that certain entries occur, whether it be done manually by a pencil or pen or whether it be done on a moving tape or the like by actuating certain buttons or other mechanical means, the important feature is some prompting means and some quality control means associated therewith.

In accordance with the present invention there is also associated with the wave signal receiver 10 a diary prompting mechanism generally indicated at 14. Among other things, and as will become apparent from the following description, the diary prompting means 14 provides an indication or a record of elapsed listening or viewing time of the wave signal receiver and hence means must be provided to make sure that when the receiver is turned on the diary prompting means 14 is energized. Obviously, the diary prompting means 14 could be connected across the receiver on-off switch so that it is energized whenever the receiver switch is turned on. As illustrated, it might also be connected to a control unit 15 which control unit 15 is connected by means of a suitable power cord 16 with a conventional wall outlet 17. The wave signal receiver 10 is likewise connected to the control unit by its conventional power cord 18 and the diary prompting unit 14 is connected to the control unit 15 by a power cord 19. The power cord 19 preferably has special connections so that the receiver power cord 18 can only be connected to the control unit 15 in one specified manner. The control unit 15 preferably includes a suitable relay arrangement whereby whenever the receiver is turned on the relay is energized so as to supply power to the diary prompting means 14. As far as the present invention is concerned, it is immaterial how power is supplied to the diary prompting means 14 so long as power is only supplied thereto when the receiver 10 is turned on.

It will be appreciated that if the diary prompting unit 14 provides a suitable reminder signal after a predetermined elapsed listening period has taken place that the collaborator will be reminded to make an entry of the information with regard to listening or viewing that took place in the preceding period, which preceding period might have various lengths. Likewise, for quality control purposes, the diary prompter 14 should include means for indicating the elapsed listening time so that a check will be had on the diary entries made at the end of a predetermined period. Referring now to Figs. 2 to 7 of the drawings, the diary prompting unit 14 comprises a suitable housing or casing 21 which preferably has a pleasing appearance since it is normally disposed adjacent the wave signal receiver being monitored and possibly disposed thereon in a manner shown in Fig. 1 of the drawings. Obviously, the casing 21 may take any suitable form which may be decorative. It could, for example, be embodied within a statuette, a flower pot, a boat, or numerous other arrangements. Preferably, however, it is embodied in a simple casing which provides a pleasing appearance.

For the purpose of supporting within the housing 21 suitable mechanism forming a part of the diary prompting unit 14, there is provided a suitable support 22 upon which are mounted the various elements of the diary prompting unit 14. Among the elements supported on the support 22 is a suitable electric motor 23 which rotates at one revolution per hour. It will be understood that the diary prompting unit 14 can produce a reminder signal after the receiver has been turned on for a predetermined length of time which may be varied widely. It could, for example, be turned on every fifteen minutes, every half hour, or every hour. It has been decided in a particular system embodying the present invention that the reminder signal be actuated after one-half hour of listening time has elapsed since that is not often enough to be disturbing to the collaborator and is still often enough to insure a relatively accurate record. Consequently, the motor 23 which rotates at one revolution per hour is connected to drive a suitable hour counter 24 suitably secured as by screws 25 to the support 22. Preferably the shaft 26 of the motor 23 which rotates at one revolution per hour is connected by suitable gears 27 and 28 with a shaft 29 connected to the hour counter 24. As illustrated, the hour counter is an indicating counter of the type which is sold on the market as a Veeder counter indicating hours and tenths of hours. Since the motor 23 is energized only when the wave signal receiver 10 is turned on, the Veeder counter 24 will indicate at all times the listening time which has elapsed, and it will be very much like an electrical meter or a gas meter so that the difference between succeeding readings will accurately indicate the listening or viewing time that has elapsed between the times when the two readings were taken.

Figure 3:
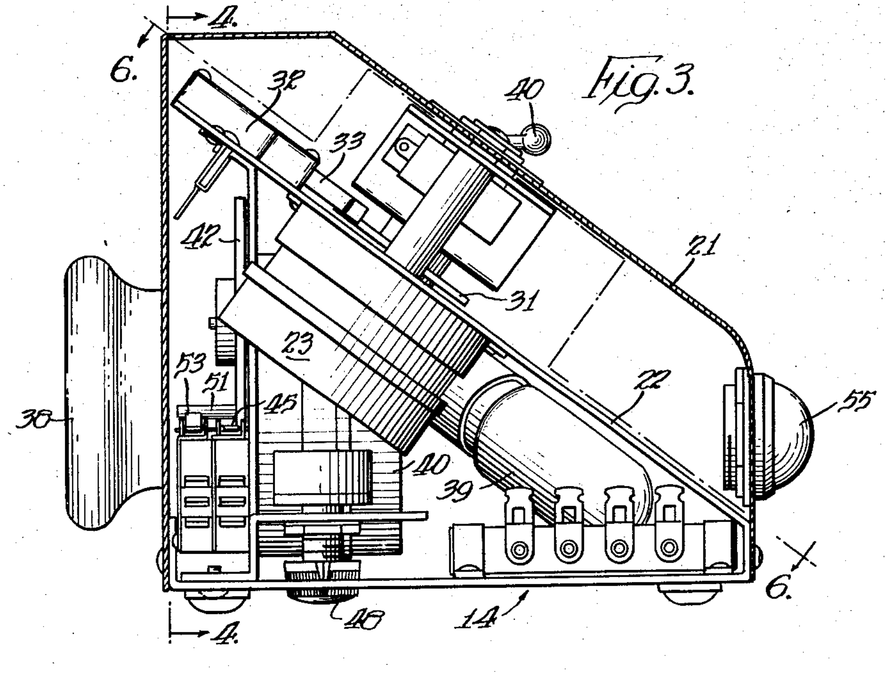
Fig. 3 is a sectional view through a portion of the apparatus shown in Fig. 1 of the drawings.
Figure 4:
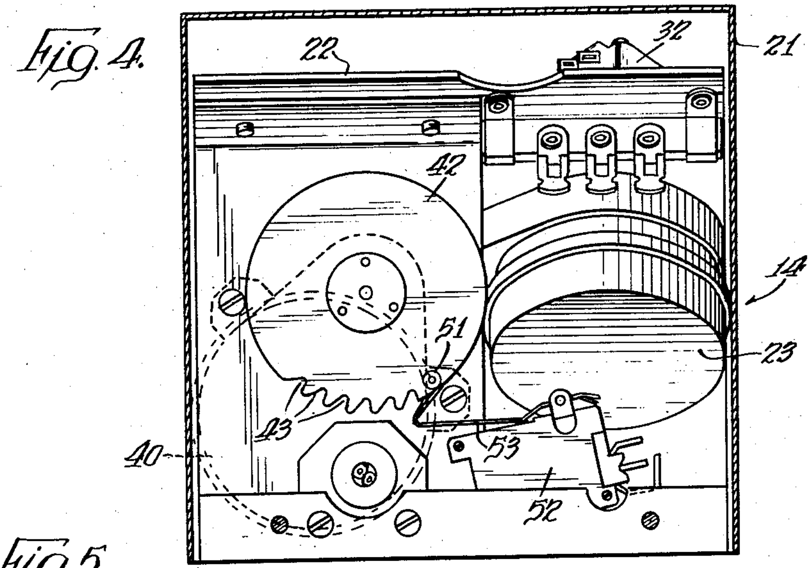
Fig. 4 is a sectional view taken on line 4—4 of Fig. 3 assuming that Fig. 3 shows the complete structure.
Figure 5:
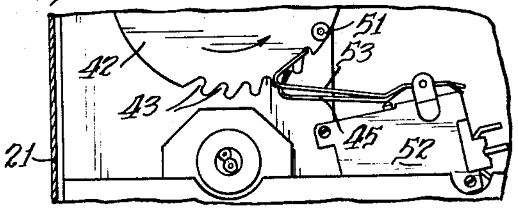
Fig. 5 is a view of a small portion of Fig. 4 showing a different operating position in the cycle of the apparatus of Fig. 4.
Figures 6, 7:
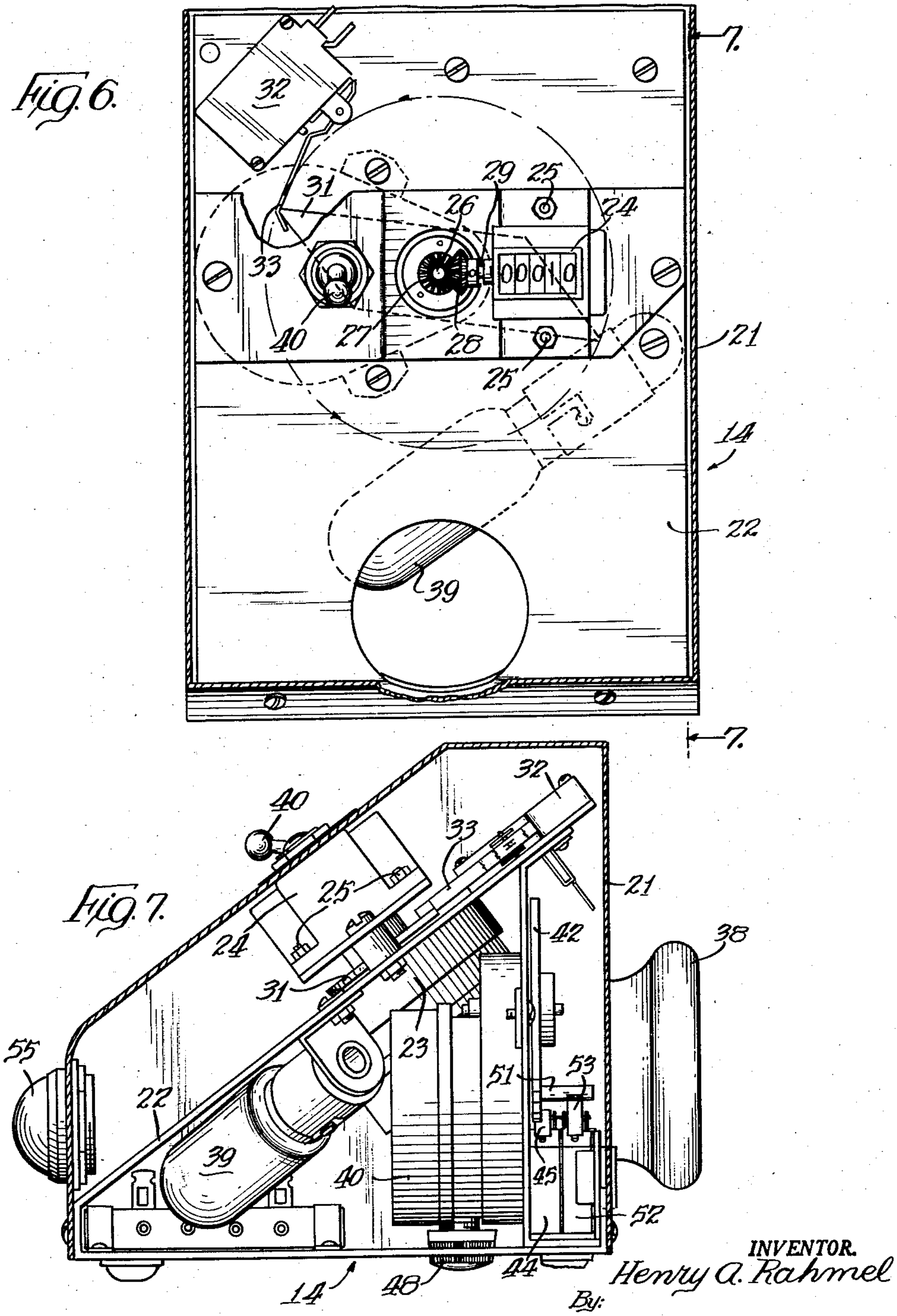
Fig. 6 is a sectional view taken on line 6—6 of Fig. 3 again assuming that Fig. 3 shows the complete structure.
Fig. 7 is a sectional view taken on line 7—7 of Fig. 6 assuming that Fig. 6 shows the complete structure.

In order to produce a reminder signal at predetermined intervals such as at half hour intervals, the motor 23 also drives a suitable cam 31 which is designed to actuate a switch 32 after each half hour of operation of the motor 23. Since the cam 31 is rotated at one revolution per hour, it will be apparent that the two cam portions thereof disposed one hundred eighty degrees apart will actuate the switch 32 at half hour intervals. As is best shown in Figs. 2, 3 and 6, the switch 32 includes a movable switch arm 33 which is disposed in the path of the cam 31 and once every half hour the switch arm 33 is actuated to close the switch 32 and perform certain control functions to be described hereinafter.

Before continuing the description of the diary prompting means 14, consideration will first be given to the schematic diagram of Fig. 2 of the drawings and the control unit there disclosed. The control unit 15 is indicated as having the power cord 16 for connecting to a suitable source of power. It also includes a receptacle 34 into which the power cord of the particular receiver such as receiver 10 may be connected, and it includes another receptacle 35 to which the power cord 19 of the diary prompting unit 14 may be connected. The receptacle 35 is preferably a special receptacle which will not receive the power cord 18 of the receiver whereby incorrect connections cannot be made. As schematically indicated in Fig. 2, the control unit 15 comprises a relay 36 which relay is energized whenever power is supplied to a device such as the receiver 10 through the control unit 15. The relay 36 has a pair of normally open contacts 36*a* connected in the supply circuit to the receptacle 35. With this arrangement it will be apparent that whenever the receiver is turned on the relay 36 will be energized and power will be supplied to the receptacle 35 and hence to the diary prompting means 14.

In order that a reminder signal may be produced at half hour intervals whenever the switch 32 is actuated to close a suitable circuit, there is provided a suitable reminder signal which may be a visible signal or audible signal or both. A visual signal is probably very satisfactory for television receivers since the attention of the listener is one of which the sense of sight is predominant. On the other hand, in connection with radio receivers, a person might be listening to the program without watching the receiver and an audible signal would be more satisfactory. Preferably, therefore, the reminder or diary prompting unit 14 includes an audible signal in the form of a buzzer 38 and a visual signal in the form of a light 39. It will be apparent that these signals 38 and 39 could be energized whenever the switch 32 was closed. However, the switch 32 is closed for a substantial period of time since the motor 23 makes only one revolution per hour and it would be desirable to have a signal which is energized for a relatively short period such as a fraction of a minute at most. Consequently, instead of having the switch 32 energize the signals 38 and 39 directly, there is provided in accordance with the present invention another motor 40 which is preferably a motor making one revolution per minute. This motor 40 is indicated as being electrically connected to the power circuit comprising the conductors 19 through the switch 32 and a suitable manual switch 40, the purpose of which will become apparent as the following description proceeds. The motor 40 is indicated as being drivingly connected to a flasher cam 42, which cam is provided with a plurality of notches 43. For actuating a suitable control switch 44, a movable switch arm 45 is schematically illustrated as having a detent portion 45*a* which is adapted to move into successive notches 43 as the flasher cam 42 rotates thereby opening and closing the switch 44. The switch 44 supplies power to the two signals 38 and 39. Thus the light 39 flashes on and off as the switch 44 is opened and closed and the buzzer 38 is turned on and off.

In order to make sure that the buzzer is not particularly annoying, there is provided a suitable switch 48 which may be moved to a plurality of positions engaging contacts 49*a*, 49*b*, and 49*c*. When the switch is moved to the position 49*a*, the buzzer 38 or audible signal 38 is relatively loud. When the switch 48 is moved to contact 49*b*, the audible signal is relatively low, while when moved to 49*c*, the audible signal is turned off.

To make sure that the signals 38 and 39 are rendered effective as soon as the switch 32 is closed, the motor 40 preferably also actuates a suitable homing cam schematically indicated by the reference numeral 50. This homing cam includes a suitable pin 51 capable of actuating a switch 52 through actuation of a switch arm 53. The switch 52 is connected in parallel with the switch 32 so that the motor 40 will remain energized even though the switch 32 has subsequently opened until the homing cam 50 moves to a predetermined position, thus insuring that the notches 43 are always in the same position when the cam 31 first initiates operation of the signals 38 and 39. The homing cam 50 is illustrated in the schematic diagram of Fig. 2 as a separate cam from the flasher cam 42. Actually, the homing cam 50 and flasher cam 42 are combined into one cam with the homing cam merely comprising the pin 51 on the flasher cam 42, which pin 51 actuates a switch arm 53.

In the operation of the system of the present invention, it is contemplated that the collaborator will keep a diary, such as the diary 11, for a period of a week, say, once every month or once every two months, and the rest of the time the collaborator will not keep any record. Obviously, then, it is undesirable during the periods when the collaborator is not required to keep a record to have the remainder signals energized at half hour intervals. To this end the switch 40, which is provided at a readily accessible place on the unit 14, is actuated to turn off the remainder signals. However, the motor 23 continues to operate whenever the receiver is turned on and the indicator 24 will give a record at all times of the elapsed listening or viewing time. Thus it is possible also to check and determine whether any variation in listening or viewing occurs during periods when the collaborator cooperates to keep a record of the listening as against those periods where the collaborator does nothing, but the counter 24 still accurately indicates the elapsed listening or viewing time.

In order that the visible signal 39 may be seen outside the housing 21 for the diary prompting means 14, the housing 21 is preferably provided with a suitable bullseye 55 at the front thereof which is lighted up when the light 39 is energized. Also, the control switch, designated also by the reference numeral 43 in Figs. 3 and 7 of the drawings, comprises a small control knob at the under side of the unit 14 whereby the loudness of the audible signal may be controlled from a maximum to the off position.

In view of the detailed description included above, the operation of the present invention will be readily understood by those skilled in the art. Briefly, with reference to Fig. 2 of the drawings, it will be apparent that whenever a wave signal receiver is connected to the receptacle 34 and the receiver is turned on with the power cord 16 connected to a suitable source of power the relay 36 will be energized to close its contacts 36*a* and to supply power to the conductors 19. Under these conditions the motor 23 will operate to drive the cam 31 at one revolution per hour, thus closing the switch 32 at one half hour intervals. Upon closure of the switch 32, the audible and/or visual means 38 and 39 are rendered effective through the operation of the motor 40 which provides accurate timing of the signal for a very short period of time of the order of a fraction of a minute. The user of the receiver is then prompted to make an entry or entries in a suitable diary indicating certain pertinent information with respect to listening or viewing in the preceding half hour. At the end of a recording period such as at the end of the week, the switch 40 is then opened, and until another reporting period comes along the means 14 operates without producing any audible signal but giving a continuous indication of the elapsed listening time or viewing time. The diary 11 is sent by the collaborator to the analysis organization for processing the information contained therein.

It is intended that the information obtained by the apparatus described above will be combined with the information obtained from recording devices which make a continuous record of the tuning condition of the wave signal receiver without any collaborator aid, and thus an excellent quality control check is provided. The analysis organization will, of course, periodically have readings made of the counter 24, so that information is available to them with regard to listening during a diary period when a record is produced in the diary 11 as well as those periods when no records are made by the indicator or counter 24 continues to indicate the elapsed listening time. It is intended that the collaborator will make entries of the readings of the counter 24 at least during the diary period.

Instead of using an indicator for indicating elapsed time of receiver use, it will be understood that a suitable timing device such as a clock could be provided which closes a switch at periodic intervals such as at half hour intervals or the like. This switch could be connected in series with the receiver set switch and a reminder signal, so that when the receiver is energized the reminder signal will also be periodically energized to encourage making entries in the diary 11. Thus, as in the arrangement of Fig. 2 of the drawings, reminder signals would be produced periodically only when the receiver is energized to encourage proper logging of receiver use.

From the above discussion it will be apparent that there has been provided a very simple arrangement for obtaining certain basic information and insuring the accuracy thereof. This accuracy can, of course, be increased by the addition of certain refinements. It should be remembered that the reminder signals are controlled on an elapsed receiver-use time basis as distinguished from an absolute or clock time basis. The reminders are, therefore, provided more or less at random with clock or absolute time. This is advantageous in that no fixed pattern of reminders is established with respect to calendar or clock time. Moreover, if one were to provide a clock time reminder providing a signal every half hour or every hour, it would require the use of a standby clock and other facilities which are relatively costly. It will be understood that in a multireceiver home each receiver in the home would be provided with a diary prompting device such as 14, as would also the automobile receivers used by the persons whose listening habits it is desired to ascertain.

Figure 8:
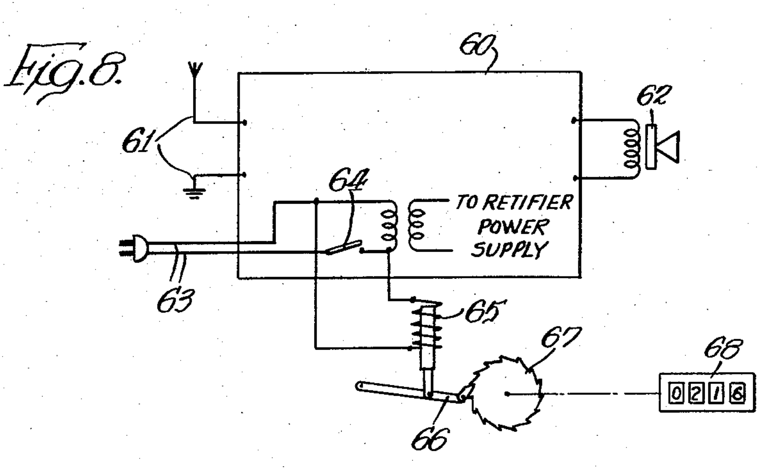
Fig. 8 is a schematic diagram illustrating a modification of the present invention.

It will be understood that with a very simple arrangement a counter to count the number of times a set is turned on could be supplied. Such a turn-on indicator would give some additional information of interest and would provide another quality control check. It will be understood that the counter for such an arrangement would be incorporated with the counter 24 of Fig. 2 of the drawings, so that the numerals of both counters would appear in one slot for collaborator convenience if desired. Referring now to Fig. 8 of the drawings, there is illustrated a wave signal receiver 60 having schematically indicated the antenna ground circuit 61 thereof and the signal reproduction unit 62 which has been designated as a loud speaker but which might equally well be a cathode ray tube in the case of a television receiver. The power cord 63 of the receiver is also indicated. The set switch for the receiver is indicated at 64. In accordance with the present invention, a suitable ratchet relay 65 is connected across the set switch, so that when the set switch 64 is closed or, in other words, when the receiver 60 is turned on, the relay 65 will be energized. Energization of the relay 65 will raise pivoted lever 66 and move ratchet wheel 67 forward one notch so as to indicate on counter 68 an additional set turn-on. Upon opening of the set switch 64, the relay 65 will be deenergized, and the lever 66 will move downwardly so as to be ready for the next actuation of the ratchet wheel 67. It will be appreciated that with the arrangement of Fig. 2, the control unit 15 could be dispensed with and the conductors 19 connected across the set switch 64 in the manner of Fig. 8, if desired. The arrangement of Figs. 1 and 2, however, is employed in those situations where it is difficult to get at the set switch of the wave signal receiver.

Figure 9:
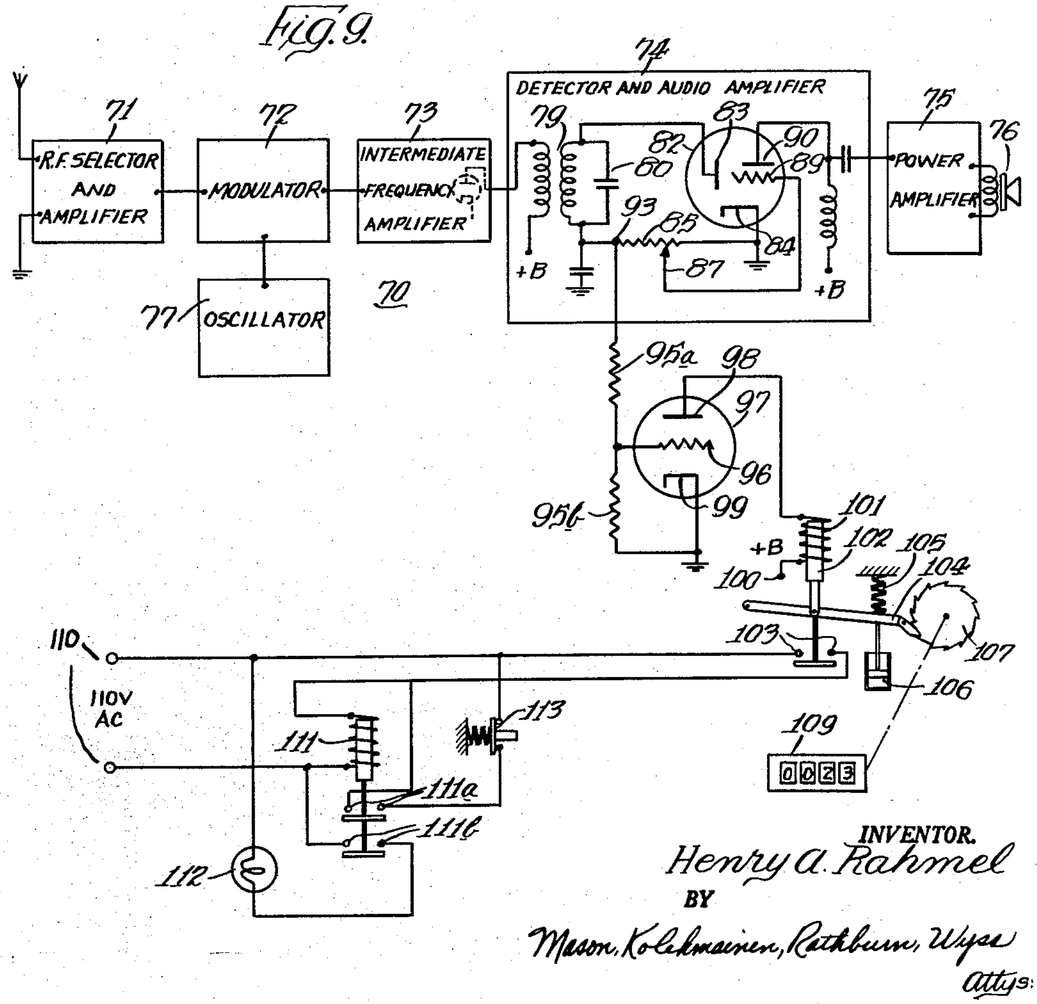
Fig. 9 is a schematic diagram illustrating another modification of the present invention.

If still more elaborate information is desired, the diary prompting unit 14 may additionally include counting means for counting retunes of the wave signal receiver. This will provide additional quality control, since it will indicate to the collaborator in making recordings after every half hour of listening that a series of retunes have been involved and consideration should be given to such retunes. This is especially so if the retune counter also produces a reminder signal at the end of each retune. Preferably any retune counters could exclude a series of stations which are tuned in as the receiver is tuned over the band to move from one station to another station which may be fairly widely separated, as far as the frequency spectrum is concerned. Such a retune counter is illustrated in Fig. 9 of the drawings in which the conventional wave signal receiver generally indicated at 70 is illustrated in schematic form. The wave signal receiver 70 is indicated as a conventional superheterodyne receiver comprising a radio frequency selector and amplifier 71, a modulator 72, and intermediate frequency amplifier 73, a combined detector and audio amplifier 74, a power amplifier 75, and a signal reproducer 76 connected in tandem in the order named. The receiver also includes the oscillator 77 connected to the modulator whereby the incoming radio frequency and the output of the oscillator produce the intermediate frequency conventional in superheterodyne receivers. Except for the detector and audio amplifier, the receiver 70 is indicated in block diagram and the operation thereof will readily be understood by those skilled in the art. The detector is inductively coupled as by the transformer 79 with the output of the intermediate frequency amplifier. One winding of the transformer 79 is connected in a tuned circuit 80, which tuned circuit is connected to the detector forming a part of the electron discharge valve 82. This electron discharge valve includes an anode 83 and a cathode 84 arranged in a conventional detector circuit. A suitable resistor 85 is connected between the cathode of the detector section of the electron discharge valve 82 and the tuned circuit 80 to provide the conventional manual volume control means common with most receivers. A suitable adjustable tap 87 on the resistor 85 provides the manual control means which is connected to the control electrode 89 of a triode section of electron discharge valve 82 comprising the plate 90 and, of course, the cathode 84. It will be apparent that every time the wave signal receiver 70 is retuned that a change in voltage will occur at terminal 93 of resistor 85 and this change in voltage is utilized to actuate a retune counter. The normal substantially negative voltage drop appearing across resistor 85 when the receiver is tuned to any station is supplied to a suitable voltage divider comprising resistors 95*a* and 95*b*. The voltage from this voltage divider is supplied to a control electrode 96 of a control tube 97 which control tube also includes an anode 98 and a cathode 99. The plate 98 is connected to a suitable source of plus B potential 100 through the winding 101 of a suitable relay 102. When the receiver 70 is tuned to a particular station, a negative drop across the resistor 85 maintains the electron discharge valve 97 nonconductive. Upon a change in tuning, however, the negative voltage drop across resistor 85 decreases whereby plate current is allowed to flow through electron discharge valve 97 and relay 102 is energized to close contacts 103 and to actuate a pivotally mounted lever 104 normally biased in a predetremined direction by a spring 105. The relay 102 is an instantaneous pickup time delay drop-out type of relay which is schematically indicated by the dashpot 106 connected to lever 104. Upon energization of a relay 102, the lever 104 is moved upwardly against the bias of spring 105 without any interference from the dashpot 106 so that the lever 104 is in readiness to engage a ratchet 107 and move the ratchet forwardly one notch. Upon deenergization of the relay 102 the spring 105 returns the lever 104 to a position shown in Fig. 9 of the drawings in a time determined by the dashpot 106. Thus every time the receiver 70 is returned, ratchet 107 will move forwardly one notch and a suitable counter 109 connected to ratchet wheel 107 will give an accurate indication of the number of retunes. The dashpot 106 is designed to insure that a count of only one will be obtained during a retune when a series of stations are successively tuned in as the receiver is tuned from one station to another which stations are substantially separated on the tuning dial.

If one is only interested in a count of the number of retunes, then the contacts 103 may be omitted. An additional feature of the present invention shown in Fig. 9 of the drawings is a retune reminder whereby whenever a retune of the receiver occurs, the collaborator is reminded to make an entry. To this end the contacts 103 are connected to a source of power 110 through the winding of a relay 111. The relay 111 is illustrated as having two sets of normally open contacts 111*a* and 111*b*. The contacts 111*a* are seal-in contacts so that as soon as the relay 111 is energized by virtue of closing of the contacts 103, the relay 111 is energized and remains energized until some subsequent action is taken. The contacts 111*b* are connected in an energization circuit for a suitable signal means 112 which may be an audible signal or visible signal or both in the manner already discussed in connection with Fig. 2 of the drawings. The signal 112 remains energized as long as the relay 111 remains energized. In order to deenergize the relay 111 a suitable manual control switch 113 is included in the circuit including contacts 111*a*. Thus the reminder signal can be deenergized upon actuation of the switch button 113 and the collaborator does this after having been reminded to make an entry. It will be appreciated that if the set turn-on counter, the set retune counter, and the retune reminder mechanism disclosed in Figs. 8 and 9 are incorporated in the diary prompter unit 14, that very accurate information is obtained as to the tuning condition of the receiver 10, 60, or 70 as the case may be, which information will enable the analysis organization to put out very accurate reports on the effectiveness of radio or television advertising at a minimum of expense with regard to gathering the basic information. In view of the detailed description included above, the operation of the arrangements of Figs. 8 and 9 will readily be understood by those skilled in the art. It will, moreover, be appreciated that various modifications which have been illustrated in Figs. 2, 8, and 9 may be combined or rearranged in various manners.

While there have been illustrated and described several embodiments of the present invention, various changes and modifications of these embodiments will occur to those skilled in the art, and it is aimed in the appended claims to cover all such changes and modifications as fall within the true spirit and scope of the present invention.

What is claimed as new and desired to be secured by Letters Patent of the United States is:

1. In a system for determining the listening or viewing habits of users of a wave signal receiver having a receiver "on-off" switch, a signaling and indicating unit separate from said receiver comprising electrically operated means for providing an indication of the elapsed time of receiver usage, means connected to a power source and interconnecting said signaling and indicating unit with said receiver and responsive to actuation of said receiver "on-off" switch to an "on" setting for placing said electrically operated means in operation to indicate the elapsed time of receiver usage, and signaling means in said unit for signaling the expiration of each of a series of successive time intervals, said interconnecting means including means for synchronizing the operation of the elapsed time indicator and the signaling means and responsive to actuation of said "on-off" switch to an "on" setting to provide a signal at the end of each of said successive time intervals, whereby the user of said receiver is notified of the expiration of the time interval.

2. The system set forth in claim 1 in which said signaling and indicating unit includes means for indicating the number of times that the receiver has been retuned.

3. The system set forth in claim 1 in which said signaling and indicating unit includes control means responsive to retuning of the receiver, and means controlled by operation of said control means for providing a signal, whereby the user is notified of the retuning of the receiver.

4. The system set forth in claim 1 in which said signaling and indicating unit includes control means operated by way of said interconnecting means in response to each actuation of said "on-off" switch to an "on" setting for indicating the number of times that said receiver has been turned on.

5. For use with a diary type system of obtaining information of the listening or viewing habits of users of a wave signal receiver having an "on-off" switch wherein the user is expected to make entries in a diary pertinent to the tuning condition of said receiver, the combination of an independent control unit comprising a first electric motor, means connecting said control unit to said receiver and operable in response to actuation of said "on-off" switch to an "on" setting for energizing said first electric motor only when the receiver being monitored is energized, indicating means actuated by said motor for indicating the elapsed time that said receiver has been energized, a second electric motor, cam means driven by said first motor for energizing said second motor at periodic intervals of such elapsed listening or viewing time, signal means for producing a signal including an electric switch, and means actuated by said second motor for energizing said signal means for a fraction of a minute at the end of each such periodic interval, whereby the user is notified of the expiration of said periodic intervals.

References Cited in the file of this patent

UNITED STATES PATENTS

| | | |
|---|---|---|
| 1,505,198 | Hough | Aug. 19, 1924 |
| 1,808,167 | Hicks | June 2, 1931 |
| 1,981,860 | Gebhard et al. | Nov. 27, 1934 |
| 2,080,330 | Ottaway | May 11, 1937 |
| 2,368,761 | Hogan | Feb. 6, 1945 |
| 2,482,615 | Fowler | Sept. 20, 1949 |